Patented Aug. 28, 1951

2,565,602

UNITED STATES PATENT OFFICE 2,565,602

STAIN-FILLER EMULSION AND METHOD OF APPLYING SAME

John R. Fisher, Jr., and James E. Price, Dayton, Ohio, assignors to Chadeloid Corporation, Dayton, Ohio, a corporation of Delaware No Drawing. Application February 24, 1947, Serial No. 730,530

10 Claims. (Cl. 117—57)

This invention deals with a method of finishing wood, and in particular with a method of staining and filling wood, and with compositions therefor.

In the copending application Mayers, Serial No. 693,803, filed August 29, 1946, and now abandoned, a product and a method are described for coating wood with a combination of filler and stain in one single step. The compositions given in said prior application are of the solution type and have yielded excellent results. However, they have one disadvantage; with them it is very difficult to remove any excess coating composition after drying has advanced to a certain stage. For this reason the articles always have to be wiped immediately after coating.

It is an object of this invention to provide coating compositions of the combined filler-stain type by which the above-mentioned disadvantage is overcome.

It is an object of this invention to provide coating compositions for wood of the combined filler-stain type which, even after complete drying, allow the wiping off of any excessive coating composition without any difficulty while the portion remaining in the pores of the wood is still firmly adhering thereto.

It is still another object of this invention to provide coating compositions which are of the rapid-drying type.

These and other objects are broadly accomplished by using and applying the stain-filler combination in the form of an emulsion rather than in the form of a solution.

In carrying out the objects of the invention, a mixture is first prepared in the form of a solution comprising a resinous binder, dispersed solid filler material with a dispersing agent therefor, pigments for coloring the pores of the wood, dyestuff, and solvent compatible with both the resinous binder and the dyestuff. This solution, according to the invention, is then suspended or emulsified by adding a relatively small amount of an oil, preferably raw oil, water and emulsifying agent. It is advantageous to add these emulsifying ingredients prior to subjecting the mixture of the solution to the grinding step and then combining the grinding for both phases of the process of preparation into one single procedure. It has been found that, although emulsions of the type described dry rapidly after being applied to wood, it is still very easy, even after days of application, to wipe off any excessive coating material. It is therefore not necessary to rush the article through the processing steps as is required with the compositions of the copending application mentioned above. Another advantage of the new coating emulsions is that sap staining is not necessary before the coating step proper.

As resinous binders, cellulose derivatives, natural gums, synthetic resins, or the like are usable. Thus, for example, nitrocellulose, cellulose acetobutyrate, manila gum, shellac, accroides gum, sandarac gum dammar gum, phenol formaldehyde resin and alkyd type resins for example, those sold under the trade name of "Duraplex" which are drying oil and non-drying oil modified alkyd resins derived from phthalic anhydride, glycerin and fatty oil acids were found to be highly satisfactory.

As filler materials, the following substances were found to be operative: silex, which is a silicia barytes, Santocel, which is expanded silica material manufactured and sold by Monsanto Chemical Company, asbestine, calcium carbonate, calcium sulfate, bentonite, Surfex, which is resincoated calcium carbonate manufactured by Diamond Alkali Company and sold by R. T. Vanderbilt Company, Inc., New York, also wood flour, starch, and corn metal.

As pigments which have a darkening effect mainly on the pores of the wood, black, red, and orange iron oxides, black toner, the iron salt of organic color of the anthraquenous series, organic lakes which are composed of dyes rendered insoluble and precipitated on base material such as china clay, aluminum hydrate, and the like, and carbon black were found suitable. Particularly, however, activated carbon was found to be advantageous, since it colors only the pores of the wood whereas carbon black darkens its entire surface, and furthermore since, due to its adsorptive capacity, it bonds the resin and dyestuff ingredients of the composition with great intensity.

The filler material is advantageously suspended by means of Darvan, a polymerized sodium salt of alkyl naphthalene sulfonic acid sold by the R. T. Vanderbilt Company, Inc., New York; however, other dispersing agents known to the art, may be used with equal satisfaction.

All acid organic dyestuffs are operative for the process and the product of my invention. Thus, for example, the following black dyestuffs were found advantageous: Buffalo Black NBR Conc. 126%, Black Stain B34951, Nigrosine 4523J Conc. Powder; the following yellow dyestuffs: Fast Wool Yellow 3GL Conc. 125%, Fast Light Yellow 3G Ex. Conc., Fast Light Yellow D3GA; the following orange-yellow dyestuffs: Metanil Yellow 1955, Calcocid Yellow MXXX Conc.; the following orange dyestuffs: Fast Light Orange 2G, Fast Light Orange GA Conc.; the following red dyestuffs: Azo Rubine Ex. Conc. 133%, Calcocid Milling Red 7B Conc., Camoisine BA Extra Conc. CF, Chromolan Bordeaux R. Croceine Scarlet MOO.

As mentioned before, the solvent has to be chosen very carefully, since this is one of the most essential factors on which the operativeness of the process of the invention depends. The solvent must have good dissolving power for the dye ingredients and for the resinous ingredients. The difficulty of finding a proper solvent which would make a compatible filler-stain composition with the use of acid organic dyestuffs is the reason that acid dyestuffs have not been used heretofore in such filler-stain mixtures.

It has been found that tetrahydrofurfuryl alcohol has this desirable property since it dissolves resins as well as acid organic dyes. However, instead of tetrahydrofurfuryl alcohol, mixture of resin solvents and dye solvents may be used with equal satisfaction provided that they are compatible with each other. Thus, for example, diethylene glycol monoethyl ether or ethylene glycol monoethyl ether in mixture with aromatic hydrocarbons or volatile alcohols were also found highly satisfactory. Other solvents operative for this invention are: diethylene glycol derivatives and homolouges, amino alkyl alcohols, such as methyl amino propanol, furfuryl alcohol, cyclohexanol and cyclohexanone alone, in mixture with each other or in mixture with aromatic hydrocarbons or volatile alcohols, such as toluol, xylol, aromatic naphthas, pertoleum naphtha, ethyl alcohol, propyl alcohol, butyl alcohol, amyl alcohol or their acetates. If a solvent or solvents having a high boiling point have been chosen, it is advisable to add some low boiling solvents in order to promote the drying step of the final coating composition.

If desired, plasticizers may be added to the mixture. Tricresyl phosphate is one of the many compounds suitable for this purpose.

In the following, a few embodiments of the invention are illustrated by way of example without intending thereby to limit the invention thereto.

Example I 23.8 parts by weight tetrahydrofurfuryl alcohol
8.51 parts by weight duraplex phthalic anhydride glycerin reaction products
9.1 parts by weight resin-coated calcium carbonate dye solution (see below)
10.2 parts by weight bentonite
1.0 part by weight tricresyl phosphate
18.2 parts by weight china clay
4.5 parts by weight wood flour (finest grade)
1.14 parts by weight activated carbon
1.82 parts by weight polymerized sodium salt of alkyl naphthalene sulfonic acid
5.56 parts by weight Tergitol #7 (sodium heptadecyl sulfate)
5.07 parts by weight linseed oil
13.7 parts by weight water In preparing the mixture of these ingredients, the resin was dissolved in the tetrahydrofurfuryl alcohol, and the dye solution was then added. In this instance the dye solution consisted of 89.5 parts by weight diethylene glycol monoethyl ether
2.89 parts by weight Calcocid Milling Red 7B Conc. having a color index number of 430
6.03 parts by weight Fast Light Orange G A Conc. C F having a color index number of 27
1.58 parts by weight Buffalo Black N B R having a color index number of 246

Thereafter the other ingredients listed above were added in the order given. The mixture was then milled in a ball mill until completely emulsified, whereupon a mixture of the following thinners was added:

11.2 parts by weight cyclohexanol
37.5 parts by weight tetrahydrofurfuryl alcohol
43.7 parts by weight methyl alcohol
7.5 parts by weight toluol The wood which was to be coated was first subjected to a preparatory step of sanding, and thereafter the emulsion was applied by spraying. The coating thus obtained was then air dried for approximately 2 hours or dried for 1 hour at a temperature not exceeding 120° F. After drying was completed, the excess coating composition was removed by wiping. The treated wood showed a walnut-hued finish.

Example II 23.8 parts by weight tetrahydrofurfuryl alcohol
5.1 parts by weight Amberol (phenol formaldehyde resin) dye solution (see below)
9.1 parts by weight resin-coated calcium carbonate
10.2 parts by weight bentonite
18.2 parts by weight china clay
4.5 parts by weight wood flour (finest grade)
1.14 parts by weight activated carbon
1.82 parts by weight polymerized sodium salt of alkyl naphthalene sulfonic acid
5.56 parts by weight sodium heptadecyl sulfate
5.07 parts by weight linseed oil
13.7 parts by weight water The resin was dissolved in the tetrahydrofurfuryl alcohol, and a dye solution was then added which contained 1.4 parts by weight Croceine Scarlet MOO
0.8 parts by weight Metanil Yellow 1955
0.25 parts by weight Buffalo Black N B R Conc. 126%
25.0 parts by weight tetrahydrofurfuryl alcohol Otherwise the preparation of the composition was the same in this example is as described in connection with Example I. The coating obtained in this instance was of a mahogany type color.

The time for grinding the mixture depends upon the device used. The best results are obtained by grinding in a ball mill for approximately 4 hours. Experiments showed that if bentonite is replaced by silica in a higher proportion and also if the content of terra alba is increased (in the instance of Examples I and II if 17.5 parts by weight of silica and 20 parts by weight of terra alba are used), the grinding procedure may be dispensed with and equally good results are obtained by merely agitating the mixture for a short period of time.

The stain-filler emulsions of the invention may be applied by spraying, brushing, dipping or any other means known in the art. Spraying, however, is the preferred and most convenient method. The excess may then be wiped off prior to drying, or else drying may be effected partly or completely, either by air drying or by heating to a temperature up to 120° F. for approximately 2 hours, prior to removing the excessive coating composition.

It will be understood that while there have been described herein certain specific embodiments of our invention, it is not intended thereby to have it limited to or circumscribed by the specific details given in view of the fact that this invention is susceptible to various modifications and changes which come within the spirit of this disclosure and the scope of the appended claims.

We claim:

1. As a coating composition for wood, an aqueous emulsion consisting of 23.8 parts by weight of tetrahydrofurfuryl alcohol, 8.51 parts by weight of an alkyd resin, 89.5 parts by weight of diethylene glycol monoethyl ether, 2.89 parts by weight of Calcocid Milling Red 7B Conc. having a color index number of 430, 6.03 parts by weight of Fast Light Orange GA Conc. C F having a color index number of 27, 1.58 parts by weight of Buffalo Black N B R having a color index number of 246, 9.1 parts by weight of surface-treated calcium carbonate, 10.2 parts by weight of bentonite, 1.0 parts by weight of tricresyl phosphate, 18.2 parts by weight of inert filler, 4.5 parts by weight of wood flour, 1.14 parts by weight of activated carbon, 1.82 parts by weight of polymerized sodium salt of alkyl naphthalene sulfonic acid, 5.56 parts by weight of sodium heptadecyl sulfate, 5.07 parts by weight of raw linseed oil, 13.7 parts by weight of water, 11.2 parts by weight of cyclohexanol, 37.5 parts by weight of tetrahydrofurfuryl alcohol, 43.7 parts by weight of methyl alcohol and 7.5 parts by weight of toluol, whereby the excess of said coating composiiton may be wiped off a surface after it has completely dried.

2. As a coating composition for wood, an emulsion containing 23.8 parts by weight of tetrahydrofurfuryl alcohol, 5.1 parts by weight of phenol formaldehyde resin, 1.4 parts by weight of Croceine Scarlet MOO, 0.8 part by weight of Metanil Yellow, 0.25 part by weight of Buffalo Black, 25.0 parts by weight of tetrahydrofurfuryl alcohol, 9.1 parts by weight of surface treated calcium carbonate, 10.2 parts by weight of bentonite, 18.2 parts by weight of terra alba, 4.5 parts by weight of wood flour, 1.14 parts by weight of activated carbon, 1.82 parts by weight of polymerized sodium salt of alkyl naphthalene sulfonic acid, 5.56 parts by weight of sodium heptadecyl sulfate, 5.07 parts by weight of linseed oil and 13.7 parts by weight of water.

3. As a coating composition for wood, an aqueous emulsion consisting of 23.8 parts by weight of tetrahydrofurfuryl alcohol, 8.51 parts by weight of alkyd resin, 89.5 parts by weight of diethylene glycol monoethyl ether, 2.89 parts by weight of Calcocid Milling Red 7B Conc. having a color index number of 430, 6.03 parts by weight of Fast Light Orange G A Conc. C F having a color index number of 27, 1.58 parts by weight of Buffalo Black N B R having a color index number of 246, 17.5 parts by weight of silica, 9.1 parts by weight of resin-coated calcium carbonate, 1.0 part by weight of tricresyl phosphate, 20.0 parts by weight of inert filler, 4.5 parts by weight of wood flour, 1.14 parts by weight of activated carbon, 1.82 parts by weight of polymerized sodium salt of alkyl naphthalene sulfonic acid, 5.56 parts by weight of sodium heptadecyl sulfate, 5.07 parts by weight of raw linseed oil, 13.7 parts by weight of water, 11.2 parts by weight of cyclohexanol, 37.5 parts by weight of tetrahydrofurfuryl alcohol, 43.7 parts by weight of methyl alcohol and 7.5 parts by weight of toluol, whereby the excess of said coating composition may be wiped off a surface after it has completely dried.

4. As a coating composition for wood, an emulsion containing 23.8 parts by weight of tetrahydrofurfuryl alcohol, 5.1 parts by weight of phenol formaldehyde resin, 1.4 parts by weight of Croceine Scarlet MOO, 0.8 part by weight of Metanil Yellow, 0.25 part by weight of Buffalo Black, 25.0 parts by weight of tetrahydrofurfuryl alcohol, 17.5 parts by weight of silica, 9.1 parts by weight of resin-coated calcium carbonate, 20.0 parts by weight of terra alba, 4.5 parts by weight of wood flour, 1.14 parts by weight of activated carbon, 1.82 parts by weight of polymerized sodium salt of alkyl naphthalene sulfonic acid, 5.56 parts by weight of sodium heptadecyl sulfate, 5.07 parts by weight of linseed oil and 13.7 parts by weight of water.

5. In a method of staining and filling wood, the step of applying an aqueous emulsion consisting of a solution of an acid organic dyestuff and a resinous binder dissolved in an organic liquid having hydroxyl groups and which is a mutual solvent for the acid dyestuffs and the binder; a raw drying vegetable oil; inert pigment; and filler, said resinous binder being selected from the group consisting of alkyd resins, phenol formaldehyde resin, natural gums, cellulose acetobutyrate and cellulose nitrate, said pigment being selected from the group consisting of iron oxides, black toner, organic lakes, carbon black and activated carbon, and said filler being selected from the group consisting of inorganic inert materials, wood flour, starch, and corn meal.

6. In a method of staining and filling wood, the steps of sanding the surface to be coated and of applying an aqueous emulsion consisting of a solution of an acid organic dyestuff and a resinous binder dissolved in an organic liquid having hydroxyl groups and which is a mutual solvent for the acid dyestuffs and the binder; a raw drying vegetable oil; inert pigment; and filler, said resinous binder being selected from the the group consisting of alkyd resins, phenol formaldehyde resin, natural gums, cellulose acetobutyrate and cellulose nitrate, said pigment being selected from the group consisting of iron oxides, black toner, organic lakes, carbon black and activated carbon, and said filler being selected from the group consisting of inorganic inert materials, wood flour, starch, and corn meal.

7. In a method of staining and filling wood, the step of applying in one coat, filler and staining materials in the form of an emulsion consisting of a solution of an acid organic dyestuff and a resinous binder dissolved in an organic liquid having hydroxyl groups and which is a mutual solvent for the acid dyestuffs and the binder; a raw drying vegetable oil; inert pigment; and filler, said resinous binder being selected from the group consisting of alkyd resins, phenol formaldehyde resin, natural gums, cellulose acetobutyrate and cellulose nitrate, said pigment being selected from the group consisting of iron oxides, black toner, organic lakes, carbon black and acivated carbon, and said filler being selected from the group consisting of inorganic inert materials, wood flour, starch, and corn meal, mechanically removing any excessive coating material, and thereafter drying the coating thus obtained.

8. In a coating composition for wood, an emulsion consisting of a solution of an acid organic dyestuff and a resinous binder dissolved in an organic liquid having hydroxyl groups and which is a mutual solvent for the acid dyestuffs and the binder; a raw drying vegetable oil; inert pigment; and filler, said resinous binder being selected from the group consisting of alkyd resins, phenol formaldehyde, natural gums, cellulose acetobutyrate and cellulose nitrate, said pigment being selected from the group consisting of iron oxides, black toner, organic lakes, carbon black and activated carbon, and said filler being selected from the group consisting of inorganic inert materials, wood flour, starch, and corn meal, whereby the excess of said coating composition may be wiped off the surface after it has completely dried.

9. In a wood staining and filling composition, an emulsion consisting of a solution of an acid organic dyestuff and a resinous binder dissolved in an organic liquid having hydroxyl groups and which is a mutual solvent for the acid dyestuffs and the binder; a raw drying vegetable oil; a dispersing agent; inert pigment; and filler, said resinous binder being selected from the group consisting of alkyd resins, phenol formaldehyde, natural gums, cellulose acetobutyrate and cellulose nitrate, said pigment being selected from the group consisting of iron oxides, black toner, organic lakes, carbon black and activated carbon, and said filler being selected from the group consisting of inorganic inert materials, wood flour, starch and corn meal, whereby the excess of said coating composition may be wiped off the surface after it has completely dried.

10. In a wood staining and filling composition, an emulsion consisting of a solution of an acid organic dyestuff and a resinous binder dissolved in an organic liquid having hydroxyl groups and which is a mutual solvent for the acid dyestuffs and the binder; a raw drying vegetable oil; a dispersing agent; inert pigment; tricresyl phosphate; and filler, said resinous binder being selected from the group consisting of alkyd resins, phenol formaldehyde, natural gums, cellulose acetobutyrate and cellulose nitrate, said pigment being selected from the group consisting of iron oxides, black toner, organic lakes, carbon black and activated carbon, and said filler being selected from the group consisting of inorganic inert materials, wood flour, starch and corn meal, whereby the excess of said coating composition may be wiped off the surface after it has completely dried.

JOHN R. FISHER, Jr.
JAMES E. PRICE.

REFERENCES CITED

The following references are of record in the file of this patent:

UNITED STATES PATENTS

| Number | Name | Date |
|---|---|---|
| 1,316,674 | Blackketter | Sept. 23, 1919 |
| 1,738,992 | Flood | Dec. 10, 1929 |
| 2,338,149 | Walker | Jan. 4, 1944 |
| 2,385,800 | Douty et al. | Oct. 2, 1945 |